Patented Feb. 24, 1948

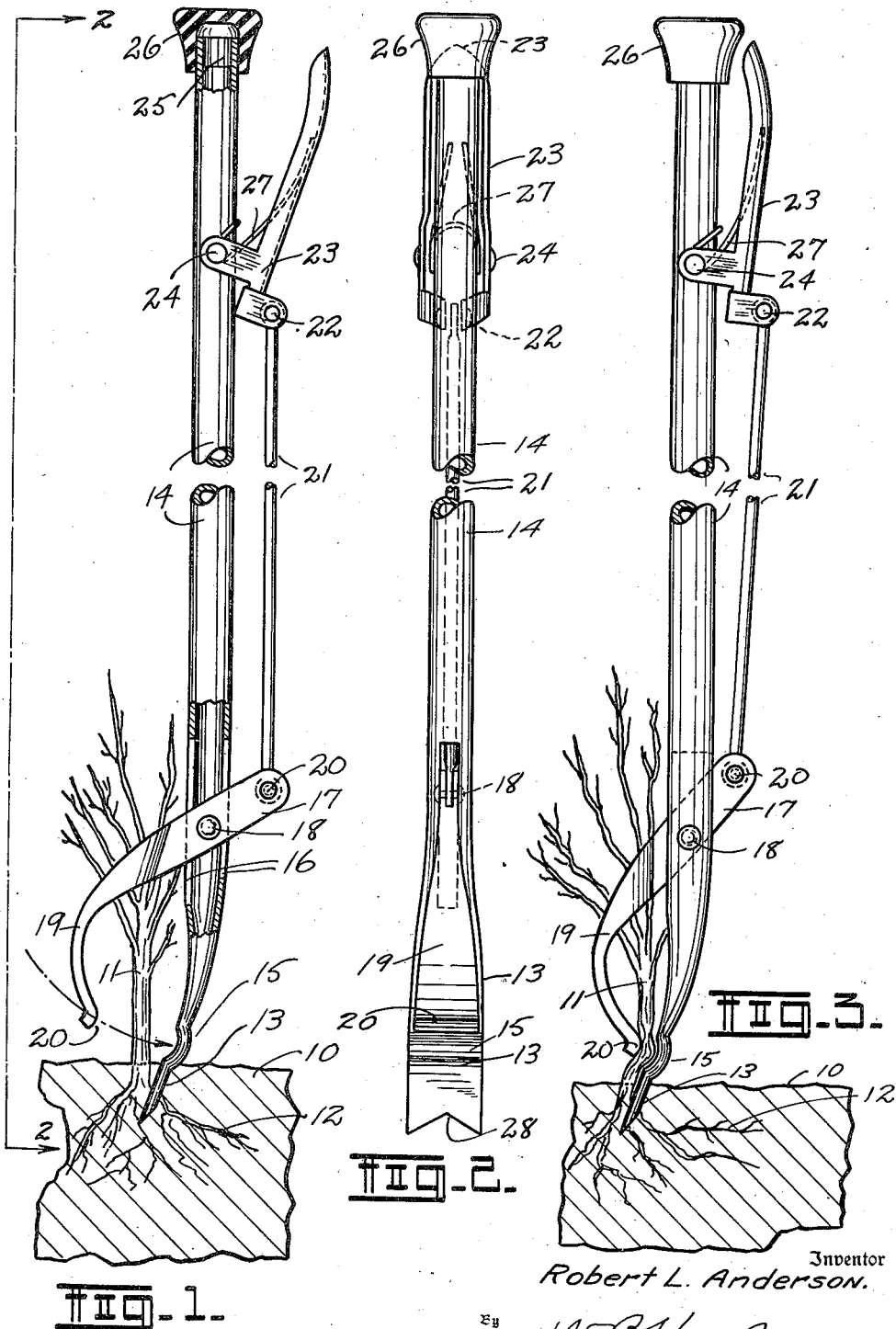

2,436,500

UNITED STATES PATENT OFFICE 2,436,500

WEEDER

Robert L. Anderson, Youngstown, Ohio

Application November 14, 1946, Serial No. 709,714

1 Claim. (Cl. 294—50.8)

This invention relates to a weeding tool and more particularly to a weeder for use in grasping and pulling out weeds.

The principal object of the invention is the provision of a weeding tool combining a digging blade and manually actuated clamping member for loosening and removing weeds.

A further object of the invention is the provision of an improved weeding tool including means for gently holding a weed or other object to be removed.

A still further object of the invention is the provision of a weeding tool including an integrally formed handle and knife member having a remotely actuated clamping member cooperating with a portion of the knife member.

A still further object of the invention is the provision of an improved weeding tool including a long knife member having means facilitating driving the same into the ground adjacent a weed to be removed.

The present invention relates to a weeding tool and more particularly to a weeder designed to enable necessary weeding operations to be performed with a minimum of manual effort. It is well known that if the soil immediately adjacent a weed is loosened, the weed may be completely removed including its root structure by grasping it between the thumb and forefinger and pulling it from the soil.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein—

Figure 1 is a side elevation of the weeder with parts in cross section and parts broken away and illustrating the same in operative relation to a section of soil and a weed therein.

Figure 2 is a front elevation of the weeder taken on line 2—2 of figure 1.

Figure 3 is a side elevation of the weeder showing the clamping portion thereof in operative engagement with a weed to be removed.

By referring to the drawings and Figure 1 in particular it will be seen that a section of soil or ground has been indicated by the numeral 10 and a weed growing therein is indicated by the numeral 11. The weed includes the usual root structure indicated by the numeral 12. The weeding tool is shown positioned partially in the ground 10 as by the partial imbedding therein of a knife member 13 which is integrally formed on the lowermost end of an otherwise tubular body member 14. A curved section 15 is formed in the knife member 13 inwardly from the pointed knife edge thereof and a pair of oppositely disposed slots 16 are formed in the tubular body of the weeder immediately above the knife member 13 thereof. A clamping member 17 is positioned through the slots 16 and pivoted to the tubular body 14 of the weeder as by means of a pivot 18. The lower extending portion of the clamping member 17 is curved downwardly and inwardly as indicated by the numeral 19 and its lowermost, outermost end portion is formed in a reverse curve 20 corresponding in degree of radius to that of the curved section 15 formed in the knife member 13 of the weeder.

The opposite end of the clamping member 17 is provided with a pivot 20 which engages an opening in one end of an operating arm 21, the other end of which is pivoted as by means of a pivot 22 to a combination handle and lever 23. The handle and lever 23 is pivoted as by a pivot 24 to the tubular body member 14 of the weeder near the uppermost end of the tubular body member. The uppermost end of the tubular body member is provided with a plug 25 and an overlying, relatively large, resilient cap 26. A spring 27 is hooked about the pivot 24 and about the tubular body member 14 and extends upwardly to engage the inner surface of the handle portion of the combination handle and lever 23, thus normally biasing the handle portion outwardly and the lever portion of the combination downwardly. This action moves the arm 21 downwardly and hence the curved end 19 of the clamping member 17 inwardly and outwardly away from the curved section 15 in the knife member 13 of the weeder.

It will thus be seen that in a weeding operation the integrally formed tubular body member 14 and its knife member 13 are driven into the ground 10 adjacent the weed 11 to be removed as by means of manual force exerted through the cap 26 as by the palm of the hand of the user. When the ground 10 is loosened about the roots 12 of the weed 11 as by moving the weeder back and forth, the combination handle and lever 23 is then grasped and moved toward the tubular body 14 of the weeder so as to cause the curved end 19 of the clamping member 17 to move inwardly and register with the weed 11 to bring it into the position illustrated in Figure 3.

By referring to Figure 3 of the drawings it will be seen that the curved section 15 in the knife blade 13 and the curved end 20 of the clamping member 17 hold the weed 11 in a gentle yet firm clamping action so that it may be easily removed from the soil as by raising the weeding tool vertically.

In Figure 2 of the drawings the formation of the knife portion 13 from the tubular stock of the body member 14 may be seen and it will be observed that the knife blade comprises a double thickness of metal throughout a majority of its area and that the lowermost end is formed by a V-shape as indicated by the numeral 28.

The weeder shown and described herein has the advantage of being easily operated and thereby conveniently used in weeding operations and at the same time is capable of economic formation by reason of its relatively few and simple parts. The novel formation of the combination body member and knife portion with the curved section 15 formed therein facilitate the weeding operation, as a shearing operation with respect to the weed is avoided and the weed thereby enabled to be completely removed from the soil which is advantageous in a weeding operation. Upon the weed being removed from the soil, the manual release of the combination handle and lever 23 permits the spring 27 to move the same outwardly and thereby release the clamping action of the weeder upon the weed so that it may be disposed of.

Having thus described my invention, what I claim is:

In a weeding tool having a handle member with a ground engaging knife formed on one end thereof, and a pivotally mounted clamping member, and means for remotely actuating the same, a bent section in the said knife member forming a transversely broad groove therein inwardly from the blade edge thereof, the said clamping member having a curved end portion of a contour similar to that of the said bend in the knife and positioned for registry therewith when moved in a clamping action as upon a weed to be removed.

ROBERT L. ANDERSON.

REFERENCES CITED

The following references are of record in the file of this patent:

UNITED STATES PATENTS

| Number | Name | Date |
| --- | --- | --- |
| 938,759 | Greene | Nov. 2, 1909 |
| 1,097,827 | Tsuboi | May 26, 1914 |
| 1,105,684 | Nuttall | Aug. 4, 1914 |
| 2,000,219 | Casey | May 7, 1935 |
| 2,029,155 | Cervenka et al. | Jan. 28, 1936 |